United States Patent

[11] 3,585,510

[72] Inventor Francis L. O'Malley
Apalachin, N.Y.
[21] Appl No. 829,618
[22] Filed June 2, 1969
[45] Patented June 15, 1971
[73] Assignee International Business Machines Corporation
Armonk, N.Y.

[54] THRESHOLD CIRCUIT APPARATUS HAVING STABILIZED INPUT LEVEL
5 Claims, 3 Drawing Figs.

[52] U.S. Cl. ........................................ 328/171,
307/230, 307/235, 328/146, 328/162, 330/69
[51] Int. Cl. ........................................ H03k 5/08
[50] Field of Search ........................................ 307/235,
237, 229, 230; 330/30 D, 69; 328/168, 169, 171,
162, 146, 150

[56] References Cited

UNITED STATES PATENTS

| | | | |
|---|---|---|---|
| 3,290,520 | 12/1966 | Wennik ........................ | 330/30 UX |
| 3,310,688 | 3/1967 | Ditkofsky ........................ | 330/30 UX |

*Primary Examiner*—Donald D. Forrer
*Assistant Examiner*—John Zazworsky
*Attorney*—Hanifin & Jancin

ABSTRACT: The differential amplifier of a threshold circuit apparatus is provided with stabilized means for maintaining the threshold level at a substantially constant value whenever the duty cycle characteristic varies.

PATENTED JUN 1 5 1971 3,585,510

INVENTOR.
FRANCIS L. O'MALLEY

BY Norman R. Bardales

ATTORNEY

THRESHOLD CIRCUIT APPARATUS HAVING STABILIZED INPUT LEVEL

BACKGROUND OF THE INVENTION

This invention relates to threshold circuit apparatus employing differential amplifier means.

Threshold circuit apparatus employing differential amplifier means are well known in the art. The present invention is a solution to the problem associated with the aforementioned prior art threshold circuit apparatus. As is well known to those skilled in the art, in the past the two inputs of the differential amplifier were DC biased at different voltage levels and the difference between these DC levels established the threshold level for the differential amplifier. When an input signal was applied to one of the inputs and it was at or exceeded the threshold level, the differential amplifier provided an output signal. However, heretofore in the prior art if the input signal was of the AC i.e. alternating, type the threshold level of the differential amplifier was susceptible to variations due to changes, e.g. drifts, in the respective DC bias levels which were caused by variations in the duty cycle of the input signal. Consequently, if the DC bias level drifted in the prior art the differential amplifier in certain cases would not respond to the input signal even though the input signal had a level which exceeded the nominal threshold level.

SUMMARY OF THE INVENTION

It is an object of this invention to provide threshold circuit apparatus having a stabilized threshold level.

It is another object of this invention to provide threshold circuit apparatus which is responsive to alternating input signals and has a stabilized threshold level irrespective of variations in the duty cycle of the input signal.

Still another object of this invention is to provide a threshold circuit apparatus which is responsive to low level alternating input signals.

According to one aspect of the invention there is provided threshold circuit apparatus which is responsive to an alternating input signal. A differential amplifier means is provided in the apparatus which has first and second inputs and an output. The input signal is applied to a predetermined one of the two inputs. Biasing means are coupled to the first and second inputs to provide first and second DC bias levels, respectively, thereat. The first and second DC bias levels provide a predetermined threshold input level between the first and second inputs. The first and second DC bias levels are responsive to the duty cycle characteristic of the input signal. A stabilizing means is provided for maintaining the threshold level at a substantially constant value whenever the duty cycle characteristic of the input signal varies. The differential amplifier means provides an output signal at the output whenever the input signal reaches the threshold level.

The foregoing and other objects, features and advantages of the invention will be apparent from the following more particular description of the preferred embodiments of the invention, as illustrated in the accompanying drawing.

BRIEF DESCRIPTION OF THE DRAWING

In the Figures, like elements are designated with similar reference numerals.

DESCRIPTION OF THE PREFERRED EMBODIMENTS

Figure 1:
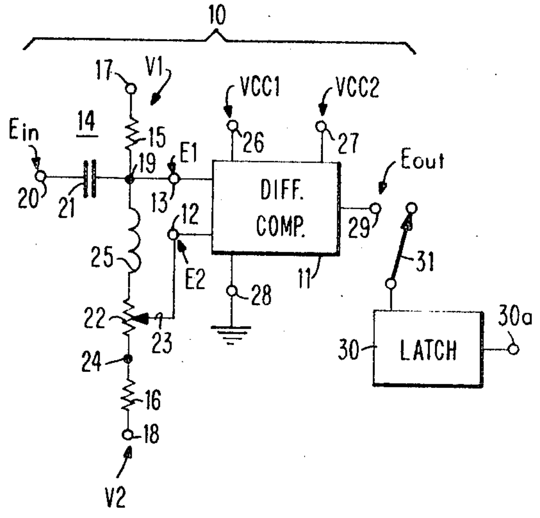
FIG. 1 is a schematic view illustrated partially in block form of an embodiment of the threshold circuit apparatus of the present invention.

Referring to FIG. 1, threshold circuit apparatus 10 has a differential comparator 11, illustrated in block form for sake of simplicity. Comparator 11 has a pair of inputs 12 and 13 referred to in the art as the inverting and noninverting inputs, respectively. A biasing network, generally indicated by the reference numeral 14, provides the respective DC bias levels at terminals 12 and 13, respectively.

More particularly, as shown in FIG. 1, biasing network 14 comprises a pair of current limiting resistors 15 and 16 which are connected to the power supply terminals 17 and 18, respectively. A voltage source, not shown, provides the respective voltages V1 and V2 at terminals 17 and 18. Resistor 15 is also commonly connected at junction 19 to input terminal 13 and to the input signal terminal 20 via AC coupling capacitor 21. The input signal Ein is applied to terminal 20. Resistor 16 is also commonly connected to the potentiometer 22 via junction 24. The potentiometer's arm 23 is connected to the terminal 12.

In accordance with the principles of the present invention, there is provided a stabilizing means for maintaining the threshold level of the comparator 11 at a constant value irrespective of drifts in the DC bias levels which are due to changes in the duty cycle of the input signal Ein. The stabilizing means is preferably embodied as an inductor 25 which is commonly coupled between the input terminals 12 and 13. More specifically, as shown in FIG. 1, the inductor 25 is connected to terminal 13 via junction 19 and to the terminal 12 via the potentiometer 22. It should be understood that alternatively the circuit of FIG. 1 may be modified so that the series-connected elements 22 and 25 are interchanged in which case the potentiometer 22 would be connected to junction 19 and its arm 23 would be connected to terminal 13, whereas the inductor 25 would be connected to terminal 12.

By way of example, differential voltage comparator 11 may be of the commercially available integrated circuit or module type referred to by the manufacturer as the SN52 710 with the terminals 26 and 27 corresponding to power supply terminals thereof to which voltages VCC1 and VCC2 are applied, respectively, and the terminal 28 corresponding to the ground terminal thereof. The output signal Eout is provided at the output terminal 29.

In certain applications it is desirable that the output signal Eout be applied to a bistable device. Accordingly, a bistable circuit such as the latch 30 may be provided and its input selectively connected to the output terminal 29 via switch 31. Terminal 30*a* is the output of latch 30.

Figure 2:
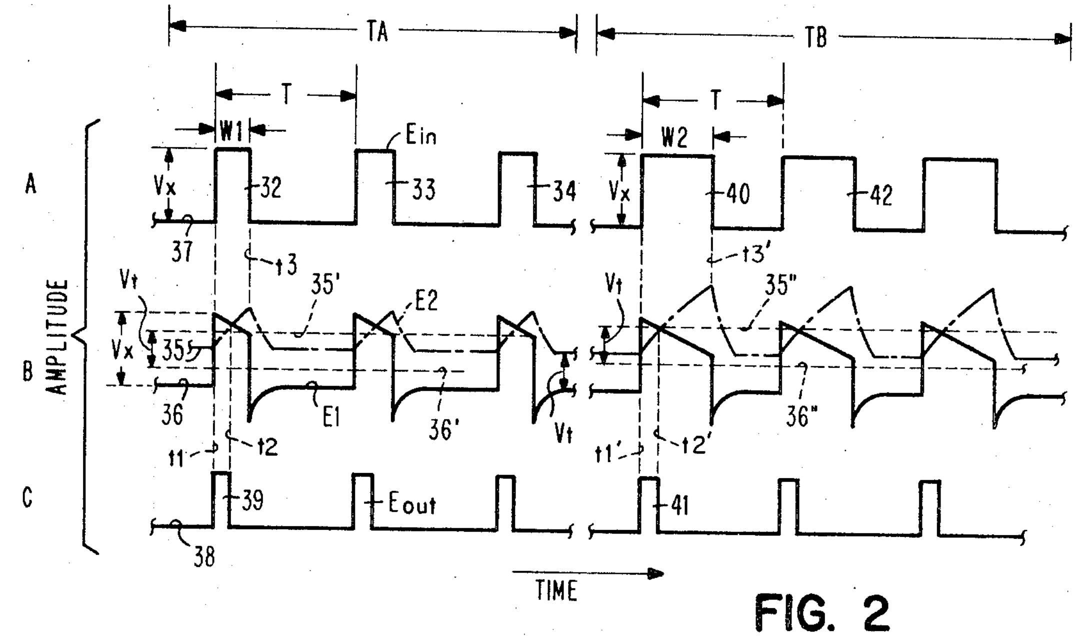
FIG. 2 is a waveform diagram of certain idealized voltage waveforms of the circuit of FIG. 1.

Referring now to FIG. 2, the operation of the threshold circuit apparatus 10 of FIG. 1 will now be described. As shown by the waveform A of FIG. 2, the alternating input signal Ein is partially illustrated as a pulse train having a predetermined duty cycle characteristic during the time period TA. More particularly, during the time period TA, the pulses 32—34 of signal Ein have a constant pulse duration W1 and *prf*=1/T. The waveforms B of FIG. 2 illustrate the superimposed voltage levels of waveforms E1 and E2 at terminals 13 and 12, respectively.

In the absence of an input signal Ein at terminal 20, the biasing voltages V1 and V2 establish the respective DC levels 35 and 36 at terminals 12 and 13, respectively. The difference between the voltage levels at terminals 12 and 13 is the aforementioned threshold level V*t* of the comparator 11. However, when an input signal Ein is applied to terminal 20, the duty cycle of the input signal Ein in coaction with the biasing voltages V1 and V2 causes the DC bias levels at terminals 12 and 13 to shift. Thus, as shown in FIG. 2, the DC bias levels at terminals 12 and 13 during the period TA have been shifted as indicated by the horizontal dash lines 35′ and 36′, respectively. However, due to the presence of the threshold level stabilizer 25, the value of the threshold level V*t* between the respective input terminals 12 and 13 remains constant.

More specifically, during the period TA prior to time *t*1 the input signal Ein is at a level 37 which is insufficient to overcome the threshold level V*t* of comparator 11, and consequently the level of the output signal Eout is at its zero output level 38, cf. waveform C, FIG. 2. At time *t*1 the pulse 32 of input signal Ein appears at terminal 20 causing a voltage rise Vx in the input signal Ein. A corresponding voltage rise Vx substantially immediately occurs in the level of the waveform E1 at terminal 13. However, due to the inductance of inductor 25 the voltage level of waveform E2 rises exponentially at terminal 12. During the duration W1 of the input signal pulse 32, the voltage level of waveform E1 decays as the voltage level of waveform E2 rises exponentially. During the time period $t1$—$t2$ the voltage level of waveform E1 exceeds the voltage level of waveform E2 and as a result an output pulse 39 appears during this period at terminal 29. At time $t2$, the voltage level of waveform E1 goes below the level of waveform E2 and consequently the pulse 39 terminates and the signal Eout returns to level 38.

At time $t3$, the input pulse 32 terminates and the input signal Ein returns to the level 37. As a result the corresponding voltage drop Vx occurs in the waveform E1. The waveform E1 returns to its steady state level 36 as the energy, which is stored in the inductor 25 as a result of the application of the input pulse 32, is dissipated. Likewise, the voltage level of waveform E2 returns to its steady state level 35 after the input pulse 32 is terminated. Waveforms Ein E1, E2, and Eout remain at their respective steady state levels 37, 36, 35, and 38 until the occurrence of the next pulse 33 whereupon the aforedescribed cycle is repeated.

For purposes of explanation, it is assumed that during the time period TB the duty cycle of the input signal Ein has changed. By way of example, it is further assumed that the change in the duty cycle results from the increased pulse duration W2 of the pulses of input signal Ein. Thus as shown in waveform A, pulse duration W2 is greater than duration W1. As a result, during the period TB the DC bias levels at terminals 12 and 13 have been again shifted as indicated by the dash lines 35'' and 36'', respectively, cf. waveforms B, FIG. 2. However, the absolute value of the threshold level $Vt$ remains constant for the reasons previously explained. At time $t1'$ input pulse 40 appears causing a corresponding voltage rise Vx in the voltage level of waveform E1 at terminal 13. The level of the waveform E2 at terminal 12 begins to rise exponentially as the voltage level of waveform E1 at terminal 13 decays. During the period $t1'$—$t2'$ the voltage level of waveform E1 is above the level of waveform E2. Signal Eout during period $t1'$—$t2'$ consequently provides a pulse 41 during this period, cf. waveform C, FIG. 2. When the level of waveform E2 exceeds the level of waveform E1 at time $t2'$, pulse 41 terminates and the output signal Eout returns to the level 38.

At time $t3'$ the pulse 40 terminates and the input signal returns to its steady state level 37. A corresponding voltage drop in the voltage level of waveform E1 occurs and thereafter rises to its steady state level 36 while the level of the waveform E2 returns to its steady state level 35 for the reasons previously explained. Waveforms Ein, E1, E2, Eout remain at their respective steady state levels 37, 36, 35, and 38 until the occurrence of the next input pulse 42 whereupon the aforedescribed cycle is repeated.

It can be readily demonstrated that other changes in the other duty cycle parameters such as time period T or PRF, and/or the levels of the input signal Ein will cause corresponding drifts in the DC levels appearing at terminals 12 and 13 but, nevertheless, the threshold level $Vt$ remains constant. Moreover, the presence of the inductor 25 ensures that an input signal of sufficient amplitude will substantially immediately cause the level of the waveform E1 to exceed the level of waveform E2 and thus cause the differential comparator 11 to provide an output signal at terminal 29. This is particularly useful when the output signal Eout is utilized to trigger the latch 30.

Figure 3:
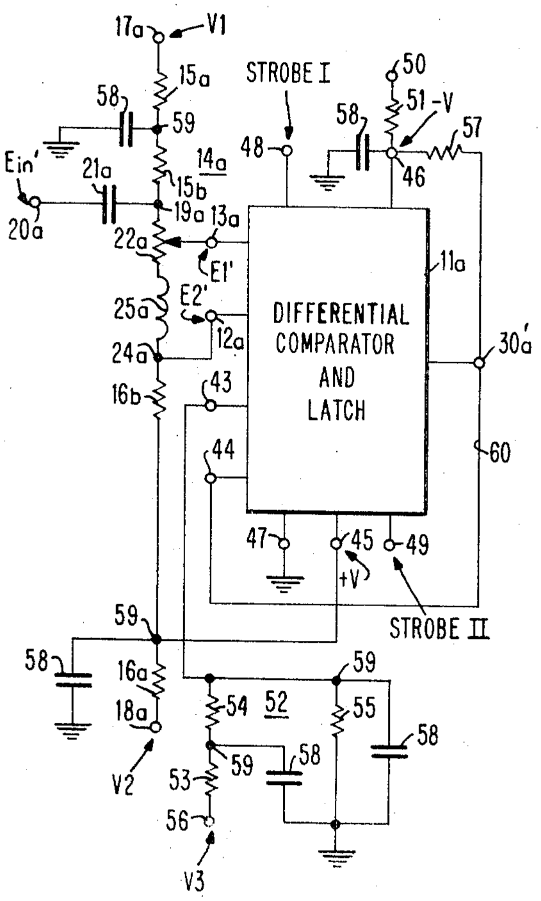
FIG. 3 is still another embodiment of the threshold circuit apparatus of the present invention.

Referring now to FIG. 3 there is shown another embodiment of the present invention. A dual circuit combination differential comparator and latch is illustrated in block form and designated by the reference numeral 11a. By way of example, circuit 11a may be of the commercially available integrated circuit or module type referred to by the manufacturer as the uA7711 and which is essentially comprised of two identical, differential voltage comparators. Terminals 12a and 13a correspond to the inverting and noninverting inputs, respectively, of one of the comparators which is utilized as the differential comparator of the present invention.

Terminals 43 and 44 correspond to the inverting and noninverting inputs, respectively, of the other comparator which functions as the latch. Terminals 45 and 46 correspond to the common power supply terminals for the dual comparators to which are applied voltages +V and −V, respectively. The outputs of the two voltage comparators of circuit 11a are commonly coupled to the output terminal 30a' of module 11a. Terminal 47 corresponds to the common ground terminal of the dual voltage comparators included in circuit 11a. The comparator associated with the terminals 12a and 13a has a gate control terminal 48 to which may be applied, if desired, a gating signal STROBE I. In the preferred mode of operation STROBE I is not utilized. Similarly, the other comparator associated with the input terminals 33, 34 has a gate control terminal 49 to which may be applied a gate control signal STROBE II.

The differential comparator associated with the inputs 12a, 13a is utilized as aforementioned as the voltage comparator of the embodiment of FIG. 3. Accordingly, across the terminals 12a, 13a there is provided a series-connected potentiometer 22a and inductor 25a, the arm 23a of potentiometer 22a being connected to the terminal 13a. The biasing network indicated generally by the reference numeral 14a comprises the current limiting series-connected resistors 15a—15b and series-connected resistors 16a—16b which are connected to the power supply terminals 17a and 18a, respectively. A power supply, not shown, provides the respective voltages V1 and V2 at terminals 17a and 18a, respectively. Resistor 15b is connected to the terminal 13a via junction 19a, the potentiometer 22a and its arm 23a. Input terminal 20a is connected via AC coupling capacitor 21a to junction 19a and the input signal Ein' is applied thereat. Resistor 16b is commonly connected via junction 24a to the terminal 12a and inductor 25a.

A power supply, not shown, is connected to terminal 50 which is connected via biasing resistor 51 to the terminal 46 and provides the voltage −V at terminal 46. The power supply, not shown, connected to terminal 18a also provides the bias voltage +V to power supply terminal 45.

The other voltage comparator, which as aforementioned functions as the latch of the embodiment of FIG. 3, has its terminal 43 biased by the biasing network generally indicated by the reference numeral 52 shown as comprising the voltage divider network 53—55. Resistor 53 is connected to a power supply terminal 56 to which is connected a power supply, not shown, which provides the voltage V3 thereat. The other input 44 is biased by the power supply, not shown, connected to terminal 50 via resistors 51 and 57. Decoupling capacitors 58 are provided at the respective junctions 59 and terminal 46.

In operation the inductor 25a stabilizes the threshold voltage across the terminals 12a and 13a. The biasing network 14a, which also includes potentiometer 22a, in coaction with the input signal Ein establishes the level of the voltage E1' and E2' appearing at terminals 13a and 12a, respectively, in a manner similar to that previously described for the operation of the comparator 11 of FIG. 1. The output of the differential comparator, i.e. the comparator associated with terminals 12a and 13a, which is connected to terminal 30a is fed back via conductor 60 to the input terminal 43 of the latch comparator. The differential comparator provides an output signal when the input signal Ein exceeds the threshold level across its input terminals 12a, 13a. In coincidence with a signal STROBE II present at the terminal 49 and an output signal from the differential comparator applied via conductor 60 to terminal 43, the latch comparator is placed in a latched condition. Removal of the signal STROBE I unlatches or resets the latch comparator.

Typical known manufacturers' types of integrated circuit modules utilized in the circuit apparatus of FIGS. 1 and 3, as well as typical values of the discrete circuit components and other parameters utilized therein are indicated in the following Tables I and II, respectively, as follows:

TABLE I

| | |
|---|---|
| Integrated circuit module 11 | Type SN52 710 |
| Resistor 15 | 619 ohms |
| Resistor 16 | 1,620 ohms |
| Resistor 22 | 1,000 ohms |
| Inductor | 1 mh. |
| Capacitor 21 | 10 μf. |
| VCC1 | +12 v. |
| VCC2 | −5 v. |
| V1 | −12 v. |
| V2 | +12 v. |

TABLE II

| | |
|---|---|
| Integrated circuit module 11a | Type uA7711 |
| Resistors 15a, 16a | 51 ohms, each |
| Resistor 15b | 619 ohms |
| Resistor 16b | 1,620 ohms |
| Resistor 22a | 1,000 ohms |
| Resistors 51, 53 | 2.7 ohms, each |
| Resistor 54 | 604 ohms |
| Resistor 55 | 221 ohms |
| Resistor 57 | 2,000 ohms |
| Inductor 25a | 1 mh. |
| Capacitor 21a | 10 μf. |
| Capacitors 58 | 15 μf., each |
| +v. | +12 v., approx. |
| −v. | −5 v., approx. |
| V1 | −12 v. |
| V2 | +12 v. |
| V3 | +5 v. |

As previously explained, the threshold circuit apparatus of the present invention is provided with a stabilized threshold level. Because the threshold level is stabilized, the present invention is particularly useful for low level input signals.

It should be understood that the particular embodiments have been described, by way of example, as being comprised of a hybrid of integrated circuits and discrete circuit hardware elements. It should be further understood, however, that the circuit could be comprised primarily of discrete hardware elements and/or may be substantially implemented completely as an integrated circuit package.

Thus, while the invention has been particularly shown and described with reference to the preferred embodiments, it will be understood by those skilled in the art that the foregoing and other changes in form and detail may be made therein without departing from the spirit and scope of the invention.

I claim:

1. Threshold circuit apparatus responsive to an alternating input signal, said apparatus comprising in combination:

differential amplifier means having first and second inputs and an output, said input signal being applied to a predetermined one of said first and second inputs;

biasing means coupled to said first and second inputs to provide first and second DC bias levels, respectively, thereat, said first and second DC bias levels providing a predetermined threshold input level between said first and second inputs, and said first and second DC bias levels being responsive to the duty cycle characteristic of said input signal; and stabilizing means comprising inductor means coupled between said first and second inputs for maintaining said threshold level at a substantially constant value whenever said duty cycle characteristic of the input signal varies, said differential amplifier means providing an output signal at said output whenever said input signal reaches said threshold level.

2. Threshold circuit apparatus according to claim 1 wherein said apparatus further comprises:

bistable means coupled to said output and being set to a predetermined one of its binary states in response to said output signal.

3. Threshold circuit apparatus responsive to an alternating input signal, said apparatus comprising in combination:

a differential amplifier having first and second inputs and an output, said input signal being applied to a predetermined one of said first and second inputs;

biasing means coupled to said first and second inputs to provide first and second DC bias levels, respectively, thereat, said firs and second DC bias levels providing a predetermined threshold input level between said first and second inputs, and said first and second DC bias levels being responsive to the duty cycle characteristic of said input signal; and a series-connected inductor and potentiometer coupled between said first and second inputs, said potentiometer being comprised in said biasing means, said inductor maintaining said threshold level at a substantially constant value whenever said duty cycle characteristic of the input signal varies, and said differential amplifier providing an output signal at said output whenever said input signal reaches said threshold level.

4. Threshold circuit apparatus according to claim 3, wherein said alternating input signal is a pulse train.

5. Circuit apparatus according to claim 3, wherein said first and second inputs comprise the inverting and noninverting inputs, respectively, of said differential amplifier and wherein said noninverting input comprises said predetermined one of said first and second inputs to which said input signal is applied.

PO-1050
(5/69)

UNITED STATES PATENT OFFICE
CERTIFICATE OF CORRECTION

Patent No. 3,585,510 Dated June 15, 1971

Inventor(s) Francis L. O'Malley

It is certified that error appears in the above-identified patent and that said Letters Patent are hereby corrected as shown below:

Col. 1 after the title, "THRESHOLD CIRCUIT APPARATUS HAVING STABILIZED INPUT LEVEL" insert the following paragraph:

—The invention herein described was made in the course of or under a contract or subcontract thereunder with the Department of the Navy.--

Col. 6, line 35, correct spelling "firs" should read ---first---.

Signed and sealed this 14th day of December 1971.

(SEAL)
Attest:

EDWARD M.FLETCHER,JR.
Attesting Officer

ROBERT GOTTSCHALK
Acting Commissioner of Patents